United States Patent [19]

Nagami et al.

[11] Patent Number: 4,476,556
[45] Date of Patent: Oct. 9, 1984

[54] APPARATUS FOR REPRODUCING INFORMATION FROM A RECORD DISC

[75] Inventors: Hayashi Nagami, Yamato; Yoshisada Taniguchi, Fujisawa; Shinpei Otsu, Yokohama; Toshio Fujimura, Fujisawa; Keizo Shimizu, Yokohama, all of Japan

[73] Assignee: Hitachi, Ltd., Tokyo, Japan

[21] Appl. No.: 429,007

[22] Filed: Sep. 30, 1982

[30] Foreign Application Priority Data

Oct. 5, 1981 [JP] Japan .......................... 56-157499

[51] Int. Cl.³ .......................................... G11B 25/04
[52] U.S. Cl. ................................. 369/258; 369/77.2; 369/264

[58] Field of Search .................. 369/77.2, 262, 264, 369/258; 360/97, 99, 133

[56] References Cited

U.S. PATENT DOCUMENTS 4,002,826  1/1977  Iemensehot .................... 346/137
4,305,146  12/1981 Hughes et al. ................. 369/77.2

Primary Examiner—Steven L. Stephan
Attorney, Agent, or Firm—Antonelli, Terry & Wands

[57] ABSTRACT

An apparatus for reproducing information from a record disc having a poor heat-resistant capability, in which a turntable for carrying the record disc is caused to rotate by a motor coupled thereto while the apparatus is made ready for a reproducing operation except when the record disc is being moved for loading and unloading of the turntable.

11 Claims, 5 Drawing Figures

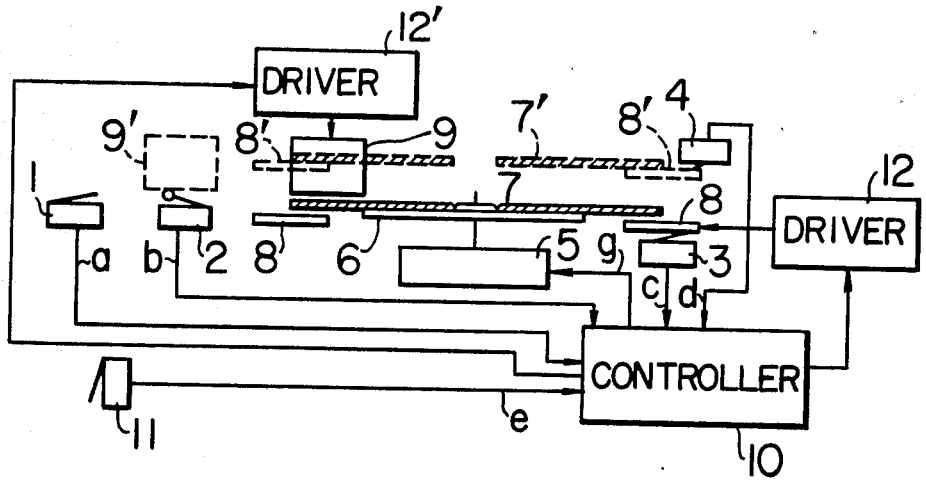

APPARATUS FOR REPRODUCING INFORMATION FROM A RECORD DISC

BACKGROUND OF THE INVENTION

The present invention relates to apparatuses for producing information from a record disc such as in video disc players.

Such reproducing apparatuses are generally in an almost closed structure in order to protect a record disc under a reproducing operation from foreign materials such as dust particles. Referring particularly to a video disc, it is received or stored in a protective sleeve or a caddy so that an operator does not touch the disc with his or her fingers to spoil the recorded surface of the disc. For reproduction, the disc which has been stored in the protective sleeve, is inserted into an insertion slot of a video disc player, and withdrawal of the protective cover causes the video disc player to be loaded with the video disc.

Record discs such as video discs are made principally of vinyl chloride and have a poor heat-resistant capability. Since the softening temperature of vinyl chloride is comparatively low, the permissible upper temperature for a video disc for the CED system is set for 45° C. Meanwhile, the reproducing apparatus is provided with an electronic circuit for processing an electric signal obtained from a record disc and the inner temperature of the apparatus may be substantially increased due to heat generated by the electronic circuit, particularly by the power supply section of the electric circuit. When the disc is placed on the turntable of the reproducing apparatus having been made ready for a reproducing operation and the disc is rotating along with the turntable, air in the vicinity of the rotating turntable and the disc is moved, thereby suppressing a local temperature rise within the reproducing apparatus, and therefore the disc suffers from almost no adverse effect of the above-mentioned heat generated by the electronic circuit. However, when the disc in the reproducing apparatus having been made ready for a reproducing operation is in a stand-by state for a reproduction (or a play) or for a repeated reproduction or is in a state in which the disc is prepared for a withdrawal after a play has been finished, the disc stands still, being on the turntable or being carried by a disc holder over the turntable which is also standing still. If, for some reason, the disc is not withdrawn or not re-played for a long time after a play of the disc has been finished or after the disc is inserted into the reproducing apparatus through the insertion slot, or if the inserted disc is not played for a long time, the disc will be left stationary (not rotated) for a long time in the above-mentioned state in the reproducing apparatus. As a result, a local temperature rise will take place in the apparatus, which may cause the temperature in the vicinity of the disc in the apparatus to exceed the permissible upper temperature for the disc.

When the disc is subjected to a temperature higher than the permissible upper temperature, it suffers from disc warp or potato chip warp or other undesirable deformation. This deformation of the disc makes it impossible for a pickup of the reproducing apparatus to properly trace the record tracks of the disc and therefore normal reproduction of information becomes impossible. Especially in an apparatus wherein the diameter of the turntable is smaller than that of the disc, deformation of the disc is more serious. For preventing such deformation, it is necessary to suppress the temperature rise by the electronic circuit. Possible countermeasures against the local temperature rise may be as follows:

(1) Installing a ventilation fan for cooling effect by the open air;
(2) Installing a circulation fan to average the local temperature rise; and
(3) Lowering the power consumption of the electronic circuit, particularly of its power supply section to limit heat generation.

The measure (1) is not suitable to a player which is intolerant of dust and also brings about an increase of cost due to provision of the ventilation fan. The measure (2) also brings about an increase of cost because of the provision of the circulation fan. The measure (3) appears the better than the others, but a certain minimum amount of electric power is needed to operate the apparatus and inclusion of a certain number of heat generating components is inevitable. Accordingly, it is most difficult to completely prevent the above described warp or deformation by the measure (3).

SUMMARY OF THE INVENTION

An object of the present invention is to eliminate the above described disadvantage of the prior art and to provide reproducing apparatus capable of suppressing undesirable deformation of a record disc.

Thus, in accordance with the present invention, the turntable of a reproducing apparatus being made ready for a reproducing operation is rotated to cause circulation of air by the rotation of the turntable even when a disc is not placed on the turntable.

DESCRIPTION OF THE PREFERRED EMBODIMENTS

Figure 1:
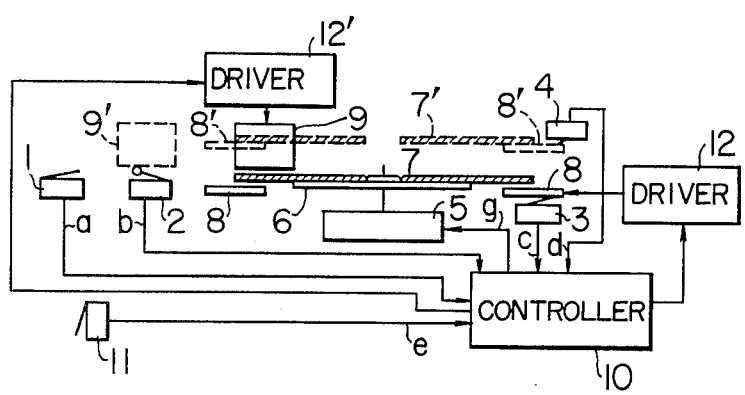
FIG. 1 is a block diagram of an embodiment of the present invention.

An embodiment of the present invention will be described with reference to FIGS. 1 and 2. A video disc player is shown in a block diagram in FIG. 1. For simplicity sake, an electronic circuit for processing an electric signal obtained from a record disc is omitted here. Reference numeral 1 designates a power switch of the player. Reference numeral 11 designates a door switch provided near the insertion slot of the player to detect opening and closing of the insertion slot (not shown). A video disc is inserted through the insertion slot into the player or is withdrawn through the insertion slot from the player when the door switch 11 as well as the power switch is actuated. Reference numeral 2 designates a stand-by switch for detecting the fact that a pickup arm 9 is in a rest position indicated by 9'. The pickup arm 9 is moved, by a first driver 12' including a motor under the control of a controller 10, in a direction almost parallel with the surface of a turntable 6. Reference numeral 3 designates a loading switch for detecting the fact that the disc 7 is placed on the turntable 6, i.e., the turntable 6 is loaded with the disc 7. The disc is supported and carried by a disc holder 8 which is arranged to be moved, by a second driver 12 including a motor under the control of the controller 10, in a direction almost perpendicular to the surface of the turntable 6. It is clear that when the turntable 6 is loaded with the disc 7, the holder 8 is disengaged from the disc 7. Reference numeral 4 designates an unloading switch for detecting the fact that the disc 7 has been lifted away from the turntable by the holder 8 up to a stand-by position indicated by 7', when the holder 8 is in a position indicated by 8'. Thus, switches 3 and 4 serve as sensor means for detecting the position of the disc. The turntable is rotated by a disc drive motor 5 controlled by the controller 10. As can be understood from the above description, the disc and the disc holder as indicated by 7 and 8 are in a state in which a disc loading has been finished with the pickup arm being in position 9, while the disc and the disc holder as indicated by 7' and 8' are in a state in which a disc unloading has been finished or the disc has just been inserted through the disc insertion slot into the apparatus with the pickup arm being in position 9'.

Now an operation of the reproducing apparatus will be described with reference to FIGS. 1 and 2. Insertion of the disc into the player (the reproducing apparatus) causes the power switch 1 to turn on (FIG. 2, (a)). Thereby, the player becomes ready for a reproducing operation. At the same time, the disc drive motor 5 is rotated by the controller 10. Responsive to a closing of the door switch 11 (FIG. 2, (e)), the controller 10 stops the motor 5 and a loading of the turntable 6 with the disc is initiated. Namely, when the second driver 12 begins to cause the disc holder 8' supporting the inserted disc 7' to go down under the control of the controller 10, the unloading switch 4 is turned off (FIG. 2, (d)). When the disc 7' and the disc holder 8' reach the positions indicated by 7 and 8, the loading is finished to turn on the loading switch 3 (FIG. 2, (c)). The controller 10, responsive to the turn-on of the switch 3, actuates the first driver 12' to move the pickup arm 9' in the rest position toward above the disc 7 in the direction almost parallel with the surface of the turntable 6. Initiation of this movement of the pickup arm 9' causes the stand-by switch 2 to turn off (FIG. 2, (b)). Responsive to the turn-off of the stand-by switch 2 the controller 10 has a control signal g (FIG. 2) to the disc drive motor 5 rising up to a high level to rotate the motor 5. Since it only takes about 10 seconds or less for the disc 7 to start its rotation on the turntable 6 after it was inserted into the apparatus, the disc is only slightly subjected to the adverse effect of warp or deformation due to local heat generation. When the pickup arm 9 reaches a position above the recorded surface of the disc 7 and the needle of the pickup arm 9 goes down to contact the disc 7 to start a playing of the disc.

Figure 2:
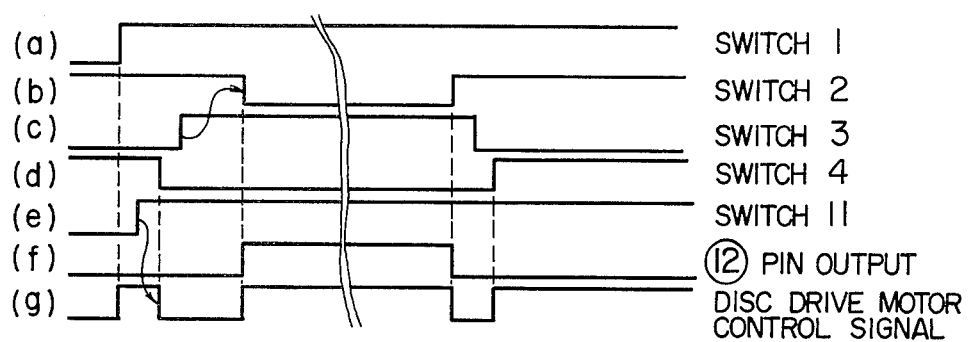
FIG. 2 is an operational waveform diagram for some portions of an embodiment of the present invention.

After the playing has been finished, the pickup arm 9 is moved back to its rest position by the first driver 12' under the control of the controller 10 to turn on the stand-by switch 2 (FIG. 2, (b)). Responsive to the turn-on of the switch 2 the controller 10 stops rotation of the disc drive motor 5 for preparation for a disc unloading. When the pickup arm 9 has returned to its rest position, the second driver 12 initiates an unloading of the disc under the control of the controller 10 to turn off the loading switch 3 (FIG. 2, (c)). When the disc unloading has been finished, the unloading switch 4 is turned on (FIG. 2, (d)). Responsive to the turn-on of the switch 4 the controller 10 rotates the disc drive motor 5 again. As a result, air in the player begins to circulate by the rotation of the turntable 6 to suppress non-uniformity of the temperature distribution within the apparatus. Accordingly, the undesirable influence of the disc warp or deformation due to local heat generation is diminished. Further, it is preferable to intensify the circulating air by or air current providing fins under the turntable, i.e., on that surface of the turntable which is other than the disc carrying surface.

When the disc is taken out, the power switch 1 is turned off to stop the rotation of the disc drive motor 5. Thereby, the player is out of the state ready for a reproducing operation.

According to the present invention, it is not necessary to provide an additional motor because a disc drive motor which is indispensable to every player or reproducing apparatus is utilized for circulation as well as for the disc rotation. In addition, the sequence can be easily altered by modifying the software for the controller microcomputer without giving rise to an increased cost.

Figure 3:
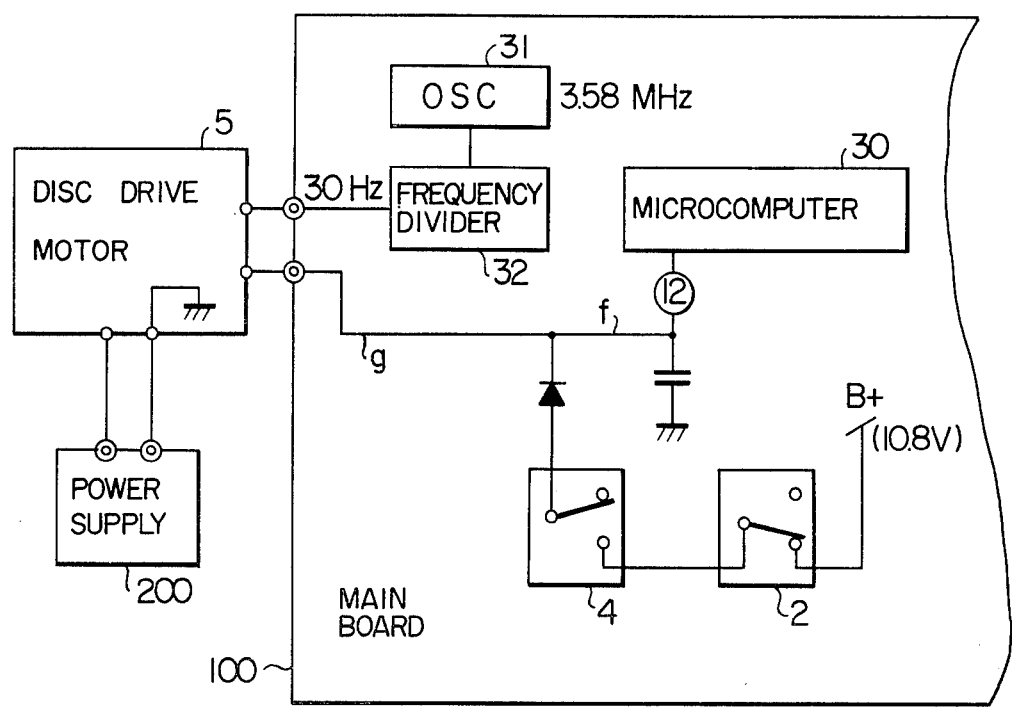
FIG. 3 is a block diagram of another embodiment of the present invention.

Referring now to FIG. 3 showing another embodiment of the present invention, a 4-bit microcomputer 30 is employed for the controller 10 shown in FIG. 1. The microcomputer 30 may be, for example, 4-bit microcomputer HD38800R04 (including a 2K word ROM) manufactured by Hitachi and having been commercially available since before the filing date of the present application. The main board 100 includes an oscillator 31 (e.g., 3.58 MHz) for producing a reference signal (e.g., 30 Hz) via frequency divider 32 for rotation of the disc drive motor 5 and further includes the microcomputer 30 for controlling a pickup arm and a disc holder in response to information from switches such as a power switch, a stand-by switch, a loading switch, an unloading switch and a door switch similar to those described with reference to FIG. 1. Reference numeral 200 designates a power supply section. In the embodiment shown in FIG. 3, the other members having no direct relation with control of rotation of the disc drive motor 5 are omitted for simplicity sake. The microcomputer 30 is generally provided for performing the following functions in the video disc player:
 (1) Analysis of a disc code contained in a reproduced video signal;
 (2) Operations for PAUSE, PLAY, RETURN, VISUAL SEARCH and the like in accordance with a signal from a key switch on the player;
 (3) Display of time during a play with LED's on the basis of the disc code;
 (4) Control of rotation of the disc drive motor;
 (5) Loading and unloading of the turntable with the disc;
 (6) Generation of a signal for the needle to skip on the disc;
 (7) Control of movement of the pickup arm;
 (8) Making LED's flicker during a PAUSE mode operation;
 (9) Control of the lifter for the needle;
 (10) Actuation of LED's depending on whether reproduced sound is stereophonic or not; and
 (11) Others
These functions are performed on the basis of the program previously stored in a ROM of the microcomputer. What is the most relevant to the subject matter of the present invention is the control of rotation of the disc drive motor 5 recited in Item (4). In this embodiment the control signal f to the motor 5 (see FIG. 2, (f)) makes the motor 5 rotate when the signal is at high level and makes the motor 5 stop when the signal is at low level. In accordance with the teaching of the present invention, while the disc is within the disc player ready for a reproducing operation, the signal g (FIG. 2, (g)) for controlling the rotation of the motor 5 is at high level except when the turntable is being loaded and unloaded. The control signal f from the microcomputer 30 is supplied from its (12) pin terminal and has such a waveform as shown at (f) of FIG. 2, in which the level is high or low in response to a turn-on or a turn-off of the stand-by switch 2.

Further in FIG. 3, a series circuit of the above-mentioned stand-by switch 2 and the unloading switch 4 is provided between B+ voltage source terminal and the control terminal of the disc drive motor 5, so that the motor 5 receives at its control terminal signal g (FIG. 2, (g)) which is the logical sum of the control signal f from the microcomputer 30 and the output signal from the series circuit of the switches 2 and 4, whereby the rotation of the motor 5 is controlled. It is to be understood that in this embodiment, a turn-on of the power switch (not shown) initiates rotation of the motor, as in the embodiment shown in FIG. 1.

Figure 4A:
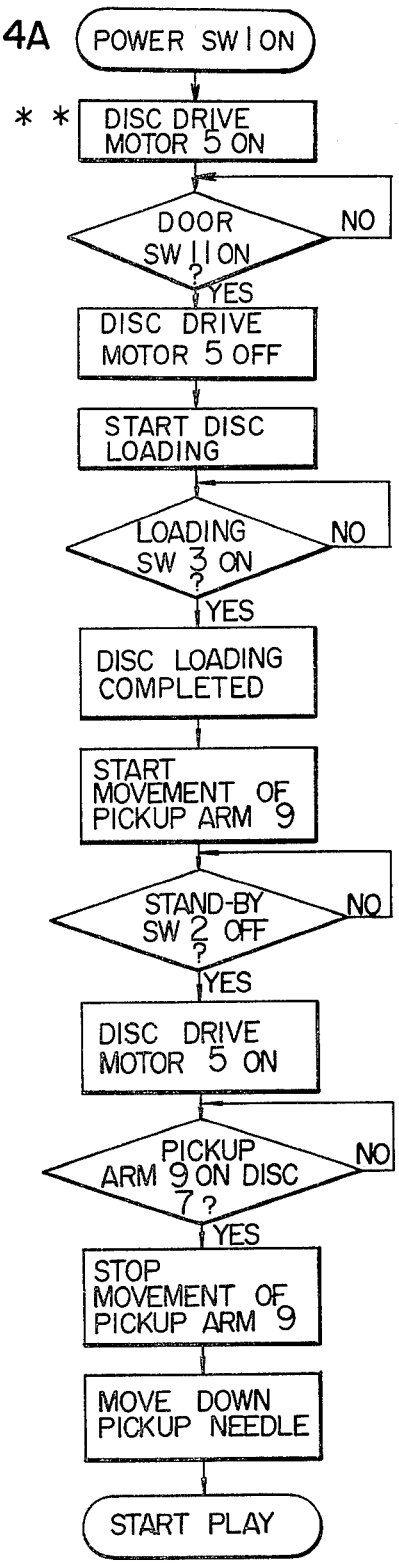
FIGS. 4A and 4B are flowcharts for a microcomputer which may be used in an embodiment of the present invention.
Figure 4B:
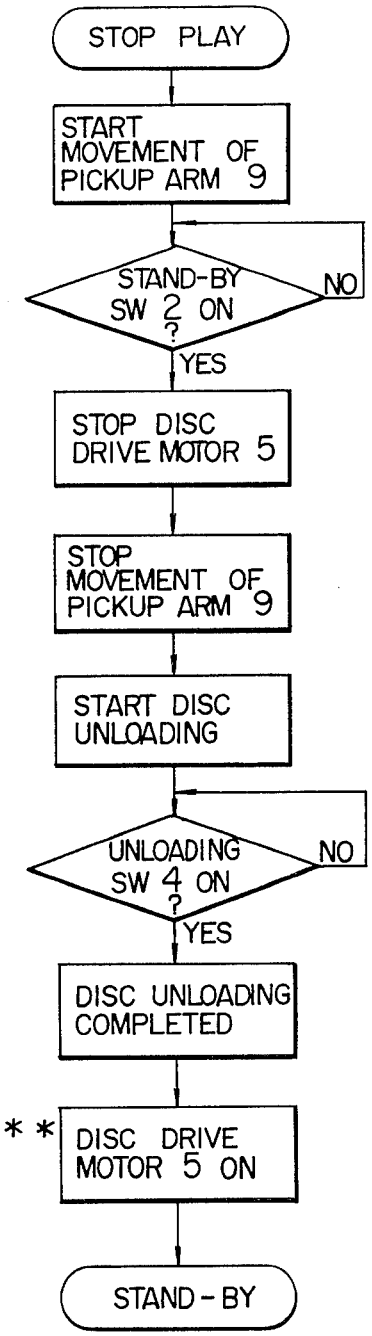

FIGS. 4A and 4B show flowcharts for the microcomputer 30, illustrating operational steps to be executed. It should be noted, however, that the steps provided with ** marks in FIGS. 4A and 4B are what is to be performed by the series circuit of the switches 2 and 4 and thus the computer 30 skips these steps to the next succeeding step.

The flowcharts shown in FIGS. 4A and 4B including the steps provided with ** marks are thus intended to illustrate an embodiment of the invention in which the microcomputer 30 also execute the steps performed by the series circuit of the switches 2 and 4 in FIG. 3 embodiment and therefore the series connection of the switches 2 and 4 for the purpose of the above-mentioned steps are no longer necessary.

The following TABLE shows an example of a program for the above-mentioned microcomputer.

TABLE

| HMCS45A | | TITLE = VDPSY.R05 12/5 | | | PAGE 00047 |
|---|---|---|---|---|---|
| ST-NO | OBJECT | ADRS | SOURCE | STATEMENTS | |
| PAGE NUMBER 020 CONTAINS 000 ROM WORDS | | | | | |
| 01537 | | | | ORG | 21-3F |
| *01538 | 004 | 021-3F | PAGE21 | SEM | 0 | ACCESS FLG ON |
| 01539 | 14E | 021-3E | | LXI | 7 |
| 01540 | 156 | 021-3D | | LYI | 6 |
| 01541 | 011 | 021-3B | | LMIIY | 8 |
| 01542 | 010 | 021-37 | | LMIIY | 0 |
| 01543 | 010 | 021-2F | | LMIIY | 0 |
| 01544 | 1EF | 021-1E | | BR | *-1 |
| 01545 | 35E 1FB | 021-3C | JOBENDL | BRL | JOBEND |
| 01546 | | | * | | |
| 01547 | 359 1FF | 021-33 | PLAYMOD | BRL | PLAYMDO |
| 01548 | | | * | | |
| 01549 | 3D0 | 021-0E | ARMREST | CAL | LFTRUP |
| 01550 | 15A | 021-1D | | LYI | 5 |
| 01551 | 207 | 021-3A | | REM | 3 | PTMCAL FLG OFF |
| 01552 | 206 | 021-35 | | REM | 2 | PLAY TIME OFF DISP 0 |
| 01553 | 151 | 021-2B | | LYI | 8 |
| 01554 | 010 | 021-16 | | LMIIY | 0 |
| 01555 | 1D6 | 021-2C | | BR | *-1 |
| 01556 | 14E | 021-1B | | LXI | 7 |
| 01557 | 157 | 021-30 | | LYI | 14 |
| 01558 | 290 | 021-21 | | RED | | DISC MOTOR OFF |
| 01559 | 011 | 021-02 | | LMIIY | 8 | LED 8 DISPLAY SET |
| 01560 | 1C2 | 021-05 | | BR | *-1 |
| 01561 | 070 | 021-0B | | LAI | 0 |
| 01562 | 16A | 021-17 | | LBI | 5 |
| 01563 | 3D4 | 021-2E | | CAL | SWREQ | REST SW ON REQUEST |
| 01564 | 078 | 021-1C | | LAI | 1 |
| 01565 | 3C3 | 021-38 | | CAL | ARMCTL | ARM MOTOR DC (-) |
| 01566 | 076 | 021-31 | | LAI | 6 |
| 01567 | 1F6 | 021-23 | | BR | BREAK11 |
| 01568 | | | * | | |
| 01569 | 157 | 021-06 | BREAK1 | LYI | 14 |
| 01570 | 090 | 021-0D | | SED | | DISC MOTOR ON |
| 01571 | 079 | 021-1B | | LAI | 9 |
| 01572 | 166 | 021-36 | BREAK11 | LBI | 6 | TIMER 1 |
| 01573 | 356 1F3 | 021-2D | | BRL | DSCOUT4 |
| 01574 | | | * | | |
| 01575 | 157 | 021-34 | BREAK2 | LYI | 14 |
| 01576 | 290 | 021-29 | | RED | | |
| 01577 | 358 1CC | 021-12 | | BRL | MONITOR |
| 01578 | | | * | | |
| 01579 | 3CF | 021-08 | RSTSWON | CAL | ARMOFF |
| 01580 | 1FC | 021-11 | | BR | JOBENDL |
| 01581 | | | * | | |
| 01582 | 074 | 021-22 | UNLOAD | LAI | 2 |
| 01583 | 16A | 021-04 | | LBI | 5 |
| 01584 | 3D4 | 021-09 | | CAL | SWREQ | UNLD SW ON REQUEST |
| 01585 | 3CD | 021-13 | | CAL | CMTONR | CADY MOTOR ON (-) |
| 01586 | 1F4 | 021-26 | | BR | BREAK2 |
| 01587 | | | * | | |
| 01588 | 3DA | 021-0C | UNLDSWON | CAL | CMTOFF | CADY MOTOR OFF |
| 01589 | 1FC | 021-19 | | BR | JOBENDL |

In accordance with the present invention, it is possible to realize a video disk player which is free from local heat generation and consequently suffers from disc deformation to a much lesser degree.

While the temperature ranges from 6° C. to 7° C. within an apparatus according to the prior art wherein the motor is not rotated in the stand-by state, according to the present invention the range has been reduced to within 1° C. That is to say, the peak value has been lowered by approximately 5° C.

We claim:

1. An apparatus for reproducing information from a record disc having a poor heat-resistant capability, comprising:
   turntable means for carrying said record disc for reproduction of information;
   motor means for rotating said turntable means;
   means for loading said turntable means with said record disc and for unloading said turntable means to detach said record disc from said turntable means; and
   means coupled to said loading and unloading means for causing said motor means to operate to rotate said turntable means while said turntable means does not carry said record disc except when said loading and unloading means is loading said record disc onto said turntable means and detaching said record disc therefrom, whereby the rotation of said turntable means causes air within said reproducing apparatus to be circulated for suppressing a possible temperature rise of the atmosphere around said record disc while said reproducing apparatus is made ready for a reproducing operation.

2. An apparatus according to claim 1, in which said turntable means is provided with fins for setting up a current of air in said reproducing apparatus.

3. An apparatus according to claim 1, in which a microcomputer is provided to at least constitute said loading and unloading means and said means for causing said motor means to operate.

4. An apparatus according to claim 1, further comprising power means for supplying power to said apparatus for enabling operation of at least said motor means and said loading and unloading means, said means for causing said motor means to operate being responsive to said power means supplying power to said apparatus for causing said motor means to continuously rotate said turntable means when said turntable means does not carry said record disc except during operation of said loading and unloading means.

5. A disc player comprising:
   turntable means on which a record disc is to be placed for reproduction of information from said record disc, said record disc having a poor heat-resistant capability;
   motor means for rotating said turntable means;
   sensor means for detecting the position of said record disc while said disc player is made ready for a reproduction operation; and
   means responsive to the output of said sensor means for controlling the operation of said motor means so that said turntable means is driven to rotate while said turntable means does not carry said record disc except when said record disc is being moved to or from said turntable means, whereby the rotation of said turntable means causes air within said disc player to be circulated for suppressing a possible temperature rise of the atmosphere around said record disc while said disc player is made ready for a reproducing operation.

6. A disc player according to claim 5, in which said turntable means is provided with fins for setting up a current of air in said disc player.

7. An apparatus for reproducing signals recorded on a disc having a poor heat-resistant capability, comprising: turntable means for carrying said disc, motor means for driving said turntable means, and means for setting said motor means in operation to rotate said turntable means while said turntable means does not carry said disc except when said disc is being moved for loading and unloading of said turntable means.

8. An apparatus according to claim 7, wherein said turntable means due to rotation thereof causes air within said apparatus to circulate for suppressing a possible temperature rise of the atmosphere around said disc while said reproducing apparatus is made ready for a reproducing operation.

9. An apparatus according to claim 8, wherein said turntable means is provided with fins for setting up a current of air in said reproducing apparatus.

10. An apparatus according to claim 8, wherein said means for setting said motor means in operation includes a microcomputer.

11. An apparatus according to claim 8, wherein said means for setting said motor means in operation to rotate said turntable means operates said motor means continuously when said turntable means does not carry said disc except during the loading and unloading of said turntable means and when said turntable means carries said disc for effecting a reproducing operation.

* * * * *